B. B. SMALL.
Combined Horse Hoe and Cultivator

No. 222,087. Patented Nov. 25, 1879.

WITNESSES:
A. Schehl.
C. Sedgwick

INVENTOR:
B. B. Small
BY
Munn & Co.
ATTORNEYS.

UNITED STATES PATENT OFFICE.

BYRON B. SMALL, OF NORTH LUBEC, MAINE.

IMPROVEMENT IN COMBINED HORSE-HOE AND CULTIVATOR.

Specification forming part of Letters Patent No. 222,087, dated November 25, 1879; application filed July 8, 1879.

*To all whom it may concern:*

Be it known that I, BYRON B. SMALL, of North Lubec, in the county of Washington and State of Maine, have invented a new and useful Improvement in Combined Horse-Hoe and Cultivator, of which the following is a specification.

Figure 1:
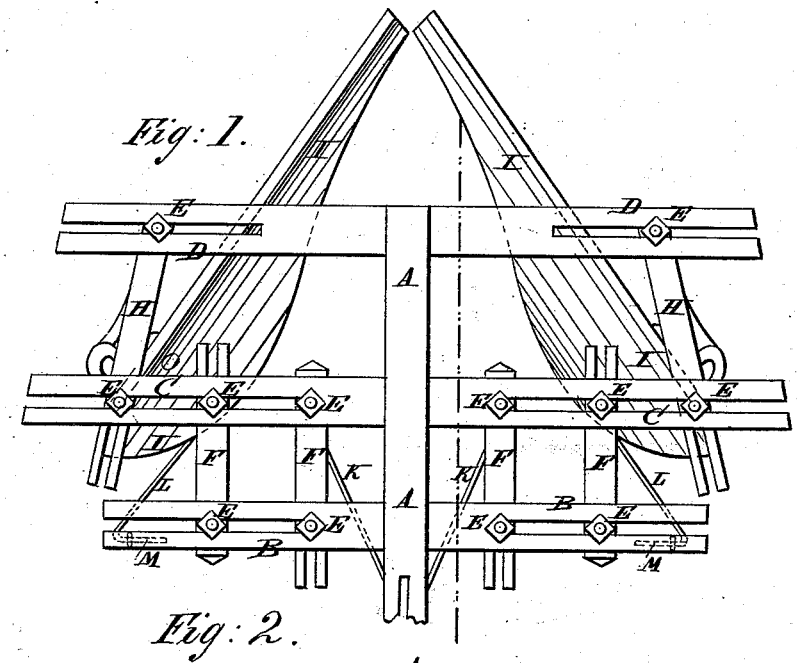
Figures 2, 4:
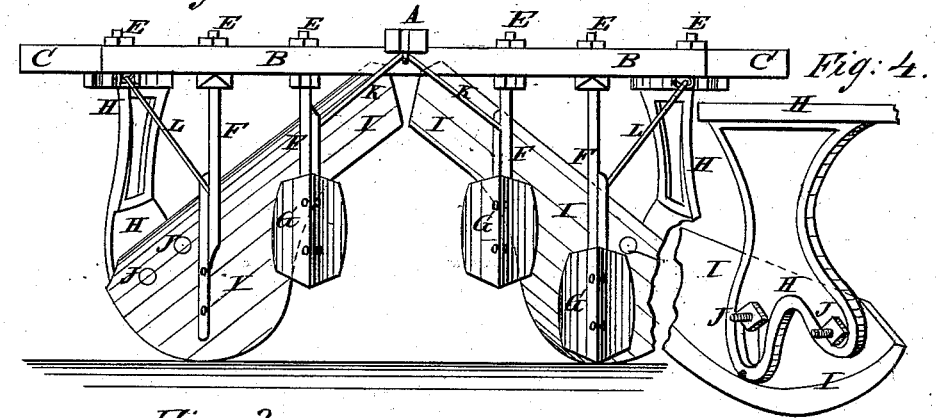
Figure 3:
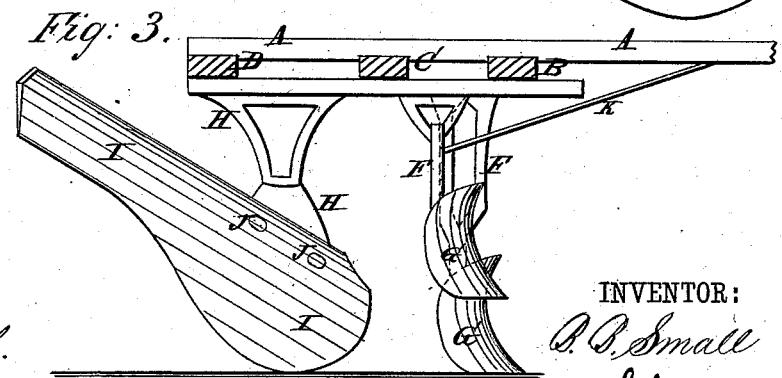

Figure 1 is a top view of my improved machine. Fig. 2 is a front view of the same. Fig. 3 is a vertical longitudinal section of the same. Fig. 4 is a detail view of a hoe-standard and the forward part of a hoe.

The object of this invention is to furnish an improved machine for cultivating and hoeing plants which shall be simple in construction, convenient in use, and effective in operation, and which may be readily adjusted as the work to be done may require.

The invention consists in combining a tongue and end-slotted cross-bars with standards, plows, and hoes, as hereinafter more particularly described.

Similar letters of reference indicate corresponding parts.

A represents the tongue, to which are attached the centers of three parallel cross-bars, B C D. The middle cross-bar, C, is the longest, the rear cross-bar, D, a little shorter, and the forward cross-bar, B, the shortest. The cross-bars B C D are slotted longitudinally from their ends to receive the bolts E, by which the top bars of the standards F of the plows G and the standards H of the hoes I are secured to the said cross-bars. By this construction, by loosening the nuts of the bolts E, the plows and hoes may be adjusted wider apart or closer together, as may be required.

The top bars of the standards F H are slotted at one end, so that they may be inclined toward or from the plants, as may be required. The two middle plow-standards, F, are made shorter than the two outer plow-standards, to bring the plows G into proper position for cultivating both sides of a ridge. The plows G are made double or with a wing upon each side, as shown in Fig. 2, and with their forward edge or angle concaved, as shown in Fig. 3.

The edge of the forward part of the hoe I is curved or convexed, to clear out the furrow or space between the ridges, and the edge of the rear part of the said hoe is concaved to give proper form to the sides and top of the ridge and throw soil around the plants. Each hoe I is secured near its forward end to its standard H by two bolts, J, the forward one of which passes through a hole in the said standard, and the rear one through a curved slot in the said standard, so that the said hoes may be adjusted, as may be required.

The middle upper parts of the standards F H may be cut away to make them lighter, and the standards H and the hoes I may be strengthened by beads formed along their edges.

The machine should be provided with handles for guiding it, and may be mounted upon wheels, if desired.

The middle plow-standards, F, are strengthened against the draft-strain by the V-brace K, the ends of which are secured to the said standards F, and its angle is secured in a slot in the tongue A. The side standards, F, are strengthened by the braces L, the rear ends of which are secured to the said standards F, and their forward ends are secured to the outer ends of the short rods M, secured to the lower side of the end parts of the forward cross-bar, B. By this construction the braces L can be adjusted to correspond with the adjustment of the standards F.

Having thus fully described my invention, I claim as new and desire to secure by Letters Patent—

The tongue A and end-slotted cross-bars B C D, in combination with standards F, plows G, standards H, and hoes I, all constructed and arranged to operate as described.

BYRON B. SMALL.

Witnesses:
  A. J. SMALL,
  J. G. REYNOLDS.